(12) United States Patent
Toku et al.

(10) Patent No.: US 11,829,130 B2
(45) Date of Patent: Nov. 28, 2023

(54) CONTROL APPARATUS AND NON-TRANSITORY COMPUTER READABLE MEDIUM FOR DETECTING ABNORMALITY OCCURRING IN SUBJECT TO BE MONITORED

(71) Applicant: OMRON Corporation, Kyoto (JP)

(72) Inventors: Takahiro Toku, Kusatsu (JP); Hisanori Igarashi, Muko (JP)

(73) Assignee: OMRON Corporation, Kyoto (JP)

( * ) Notice: Subject to any disclaimer, the term of this patent is extended or adjusted under 35 U.S.C. 154(b) by 138 days.

(21) Appl. No.: 17/279,080

(22) PCT Filed: Oct. 8, 2019

(86) PCT No.: PCT/JP2019/039603
§ 371 (c)(1),
(2) Date: Mar. 23, 2021

(87) PCT Pub. No.: WO2020/085077
PCT Pub. Date: Apr. 30, 2020

(65) Prior Publication Data
US 2022/0050448 A1 Feb. 17, 2022

(30) Foreign Application Priority Data
Oct. 24, 2018 (JP) .................................. 2018-199664

(51) Int. Cl.
*G05B 23/02* (2006.01)
*G05B 19/042* (2006.01)

(52) U.S. Cl.
CPC ..... *G05B 23/0283* (2013.01); *G05B 19/0426* (2013.01); *G05B 23/0221* (2013.01); *G05B 23/0264* (2013.01)

(58) Field of Classification Search
CPC ............ G05B 23/0283; G05B 19/0426; G05B 23/0221; G05B 23/0264
(Continued)

(56) References Cited

U.S. PATENT DOCUMENTS

| 6,199,018 B1* | 3/2001 | Quist | G01M 13/045 |
| | | | 706/912 |
| 2003/0004688 A1* | 1/2003 | Gupta | H04L 63/1416 |
| | | | 702/188 |

(Continued)

FOREIGN PATENT DOCUMENTS

| JP | 2008072047 | 3/2008 |
| JP | 2012243192 | 12/2012 |

(Continued)

OTHER PUBLICATIONS

"Search Report of Europe Counterpart Application", dated Jun. 14, 2022, pp. 1-9.

(Continued)

*Primary Examiner* — Paul D Lee
(74) *Attorney, Agent, or Firm* — JCIPRNET

(57) ABSTRACT

A control apparatus includes: a management unit that updates internal state values for each control period with a state value generated in a subject to be controlled; a feature quantity extraction unit that calculates a feature quantity from a change of a second internal state value for each unit section determined according to a value of a first internal state value; and an abnormality detection unit that generates detection results indicating whether any abnormality has occurred in a subject to be monitored included in the subject to be controlled, on the basis of the feature quantity. The feature quantity extraction unit and the abnormality detection unit output the values of the first internal state value (Continued)

used to determine the unit section, in correspondence with the corresponding unit section.

11 Claims, 12 Drawing Sheets

(58) Field of Classification Search
USPC .......................................................... 714/2
See application file for complete search history.

(56) References Cited

U.S. PATENT DOCUMENTS

| | | | | |
|---|---|---|---|---|
| 2007/0088550 | A1* | 4/2007 | Filev | G06F 18/10 704/245 |
| 2015/0199245 | A1* | 7/2015 | Goto | G05B 19/414 714/4.5 |
| 2015/0241523 | A1* | 8/2015 | Scherr | G01R 33/077 324/244 |
| 2016/0033941 | A1* | 2/2016 | T | G05B 19/0428 700/81 |
| 2018/0017960 | A1* | 1/2018 | Shirata | G05B 23/0221 |
| 2018/0164768 | A1* | 6/2018 | Kawanoue | G05B 23/0294 |
| 2018/0239723 | A1* | 8/2018 | Ota | G06F 13/1689 |
| 2018/0267510 | A1* | 9/2018 | Nishiyama | G05B 19/4183 |

FOREIGN PATENT DOCUMENTS

| | | |
|---|---|---|
| JP | 2018133037 | 8/2018 |
| JP | 2018151918 | 9/2018 |
| JP | 2018160078 | 10/2018 |
| WO | 2018047804 | 3/2018 |

OTHER PUBLICATIONS

"International Search Report (Form PCT/ISA/210) of PCT/JP2019/039603", dated Dec. 3, 2019, with English translation thereof, pp. 1-4.

"Written Opinion of the International Searching Authority (Form PCT/ISA/237) of PCT/JP2019/039603", dated Dec. 3, 2019, with English translation thereof, pp. 1-8.

* cited by examiner

FIG. 10

(a) raw data — 132

| Time | Var_1 | frame ID |
|---|---|---|
| 0:00:00000 | 1 | 1 |
| 0:00:00001 | 2 | 1 |
| 0:00:00002 | 3 | 1 |
| 0:00:00003 | 4 | 1 |
| 0:00:00004 | 5 | 1 |
| 0:00:00005 | 6 | 2 |
| 0:00:00006 | 7 | 2 |
| 0:00:00007 | 8 | 2 |
| 0:00:00008 | 9 | 2 |
| 0:00:00009 | 10 | 2 |

1320  1322  1324

(b) feature quantity — 134

| Time | frame ID | feature quantity |
|---|---|---|
| 0:00:0005 | 1 | 5 |
| 0:00:0010 | 2 | 10 |

1340  1342  1344

(c) detection result — 136

| Time | frame ID | score |
|---|---|---|
| 0:00:0009 | 1 | 0.5 |
| 0:00:0014 | 2 | 0.7 |

1360  1362  1364

| frame ID | Time | Var_1 | feature quantity | score |
|---|---|---|---|---|
| 1 | 0:00:00000 | 1 | – | – |
| 1 | 0:00:00001 | 2 | – | – |
| 1 | 0:00:00002 | 3 | – | – |
| 1 | 0:00:00003 | 4 | – | – |
| 1 | 0:00:00004 | 5 | 5 | 0.5 |
| 2 | 0:00:00005 | 6 | – | – |
| 2 | 0:00:00006 | 7 | – | – |
| 2 | 0:00:00007 | 8 | – | – |
| 2 | 0:00:00008 | 9 | – | – |
| 2 | 0:00:00009 | 10 | 10 | 0.7 |

CONTROL APPARATUS AND NON-TRANSITORY COMPUTER READABLE MEDIUM FOR DETECTING ABNORMALITY OCCURRING IN SUBJECT TO BE MONITORED

CROSS-REFERENCE TO RELATED APPLICATION

This application is a 371 application of the International PCT application serial no. PCT/JP2019/039603, filed on Oct. 8, 2019, which claims the priority benefit of Japan Patent Application No. 2018-199664, filed on Oct. 24, 2018. The entirety of each of the above-mentioned patent applications is hereby incorporated by reference herein and made a part of this specification.

BACKGROUND

Technical Field

The present invention relates to a control apparatus capable of detecting any abnormality that may occur in a subject to be monitored and relates to a control program for realizing the control apparatus.

Related Art

At various production sites, there is a need to improve an equipment utilization rate by predictive maintenance of machines and apparatuses. The predictive maintenance means a maintenance mode in which maintenance works such as repair, replacement, and the like are performed before an equipment comes into a state unless the equipment is stopped due to a fact that any abnormality in machines and devices is detected.

In order to realize the predictive maintenance, a construction is necessary in which state values of machines and apparatuses are collected and whether any abnormality has occurred in the machines and apparatuses is judged based on the collected state values.

In order to realize this predictive maintenance, it is necessary to process a plurality of pieces of time series data obtained from the machines and apparatuses. With respect to the conventional general configuration, for example, as shown in Japanese Patent Laid-Open No. 2012-243192 (Patent literature 1), in the conventional configuration, a plurality of pieces of time series data are aggregated in a host data logger or the like and are integrated based on time information and the like.

This data logger system has a relatively long data collection cycle, and it takes a relatively long time from the actual collection of data to the aggregation of data for the data logger system. If abnormality monitoring is performed using this configuration, delay time until any abnormality generated in machines and apparatuses to be monitored is detected cannot be shortened.

LITERATURE OF RELATED ART

Patent Literature

Patent literature 1: Japanese Patent Laid-Open No. 2012-243192

SUMMARY

Problems to be Solved

Thus, there is a possibility that the delay time for detecting an abnormality can be shortened in a manner of realizing abnormality detection processing by a control apparatus that controls a machine, an apparatus, and the like to be controlled. However, in order to realize the abnormality detection, it is necessary to use data over a plurality of control cycles, a processing delay in the control apparatus and the like also occur.

Therefore, a mechanism for consistent processing from the collection of state values from a subject to be controlled to the abnormality detection processing in a control apparatus is required. One objective of the present invention is to satisfy this requirement.

Means to Solve Problems

A control apparatus according to an example of the present invention includes: a management unit that acquires a state value generated in a subject to be controlled for each predetermined control period, and updates an internal state value held internally; and a feature quantity extraction unit that, for each unit section determined according to a value of a predetermined first internal state value, calculates a feature quantity from a change of a predetermined second internal state value generated in the unit section. The feature quantity extraction unit outputs the value of the first internal state value used to determine the corresponding unit section, in correspondence with the calculated feature quantity. The control apparatus further includes an abnormality detection unit that generates a detection result indicating whether any abnormality has occurred in a subject to be monitored included in the subject to be controlled, on the basis of the feature quantity calculated by the feature quantity extraction unit. The abnormality detection unit outputs the value of the first internal state value associated with the feature quantity used for generating the detection result, in correspondence with the generated detection result.

According to this configuration, because the value of the first internal state value for identifying the unit section of the second internal state value which is a subject is associated with both the feature quantity calculated by the feature quantity extraction unit and the detection result generated by the abnormality detection unit, the consistency can be ensured from the input of the internal state value, the calculation of the feature quantity to the output of the detection result.

The value of the first internal state value output by the feature quantity extraction unit may be input to the abnormality detection unit. According to this configuration, the consistency of processing can be surely ensured by ensuring the continuity between the output of the feature quantity extraction unit and the input of the abnormality detection unit.

The feature quantity extraction unit may receive a designation of an arbitrary internal state value as the first internal state value. According to this configuration, a user can arbitrarily set the optimum unit section by using the first internal state value corresponding to the subject to be monitored included in the subject to be controlled.

The feature quantity extraction unit may determine a section in which the first internal state value shows the same value as a unit section. According to this configuration, a section in which the first internal state value does not change can be easily set as a unit section.

The feature quantity extraction unit may, for each unit section, calculate the feature quantity from the change of the second internal state value in a partial section in which a predetermined third internal state value shows a predetermined value in the unit section. According to this configuration, the feature quantity can be calculated from a partial section of the unit section determined according to the value of the first internal state value, and the abnormality detection processing can be executed.

The abnormality detection unit may refer to learning data prepared in advance and calculate, from the feature quantity, a value indicating a possibility that any abnormality has occurred in the subject to be monitored. According to this configuration, a possibility that an abnormality has occurred in the subject to be monitored can be quantitatively evaluated.

The abnormality detection unit may generate a detection result indicating whether an abnormality has occurred in the subject to be monitored based on whether a value indicating the possibility that any abnormality has occurred in the subject to be monitored is within a predetermined threshold range. According to this configuration, whether there is an abnormality in the subject to be monitored can be quantitatively determined.

The learning data may include a group of feature quantities obtained in a normal case, and the abnormality detection unit may calculate the value indicating the possibility that any abnormality has occurred in the subject to be monitored based on a degree of deviation of the feature quantity with respect to the group of feature quantities included in the learning data. According to this configuration, a possibility that an abnormality has occurred in the subject to be monitored can be quantitatively evaluated according to the degree of deviation from a normal state.

The control apparatus may further include a storage unit that stores at least one of time series data of the feature quantity corresponding to the value of the first internal state value and time series data of the detection result corresponding to the value of the first internal state value. According to this configuration, the storage of various information calculated inside the control apparatus, and the output of the various information calculated inside the control apparatus to an external apparatus or the like can be facilitated.

The management unit may further internally hold calculation results of the feature quantity extraction unit and the abnormality detection unit as internal state values that can be referred to by a program executed by the control apparatus. According to this configuration, the processing related to the abnormality detection can be appropriately executed by referring to the calculation results of the feature quantity extraction unit and the abnormality detection unit in the program executed by the control apparatus.

According to another example of the present invention, a control program executed by a control apparatus is provided. The control program causes the control apparatus to perform: acquiring a state value generated in a subject to be controlled for each predetermined control period and updating an internal state value held internally; for each unit section determined according to a value of a predetermined first internal state value, calculating a feature quantity from a change of a predetermined second internal state value generated in the unit section; outputting the value of the first internal state value used to determine the corresponding unit section, in correspondence with the calculated feature quantity; generating a detection result indicating whether any abnormality has occurred in a subject to be monitored included in the subject to be controlled, on the basis of the calculated feature quantity; and outputting the value of the first internal state value associated with the feature quantity used for generating the detection result, in correspondence with the generated detection result.

According to this configuration, because the value of the first internal state value for identifying the unit section of the second internal state value to be a subject is associated with both the calculated feature quantity and the generated detection result, the consistency can be ensured from the input of the internal state value, the calculation of the feature quantity to the output of the detection result.

Effect

According to the present invention, consistent processing from the acquisition of state values from the subject to be controlled to the abnormality detection processing can be performed.

BRIEF DESCRIPTION OF THE DRAWINGS

FIG. 10 is a diagram for illustrating an example of a data structure stored in an internal DB of the control apparatus of the abnormality detection system according to the embodiment.

FIG. 11 is a diagram showing an example of time series data which is obtained by combining each time series data shown in FIG. 10.

DESCRIPTION OF THE EMBODIMENTS

Figure 1:
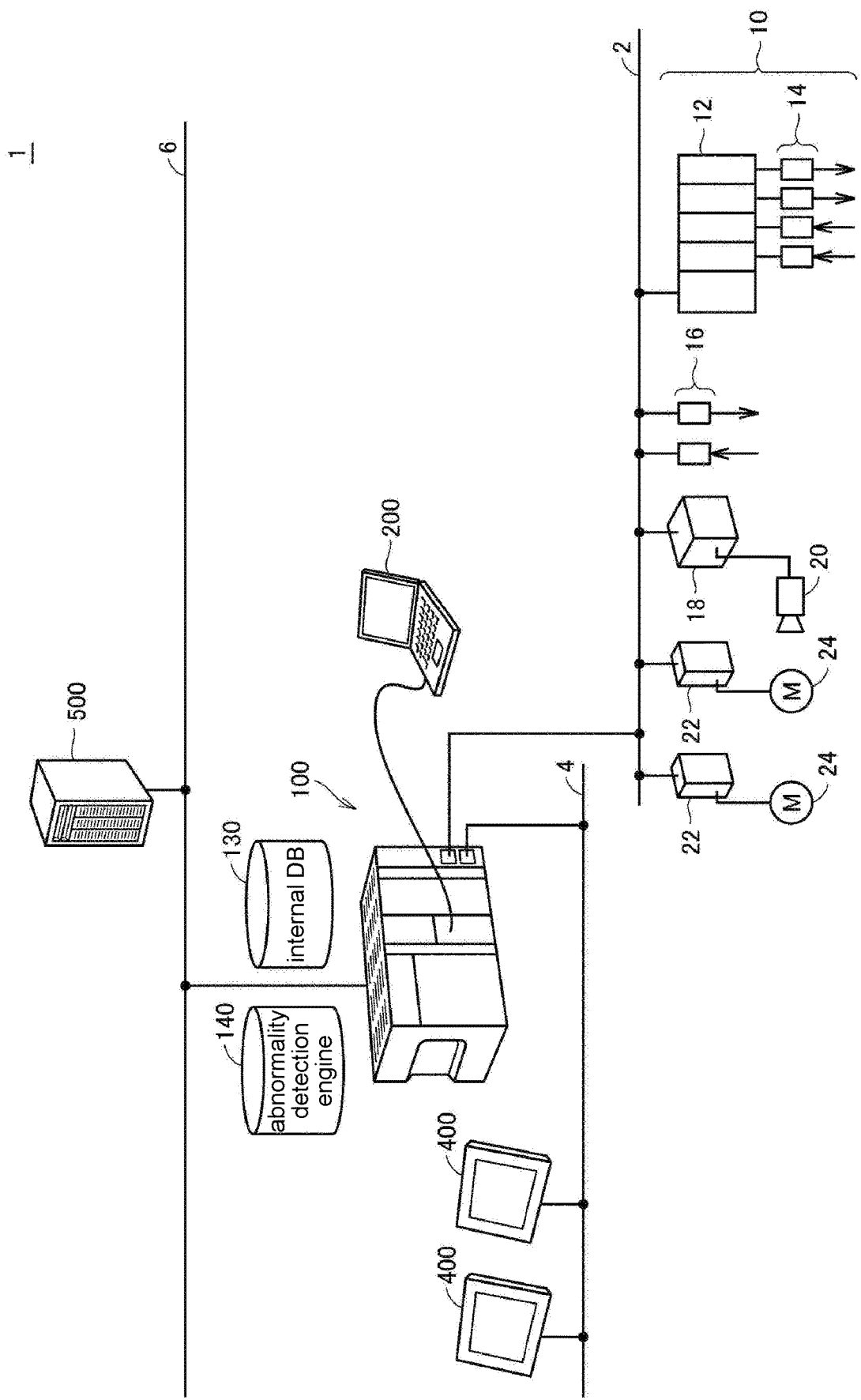
FIG. 1 is a schematic diagram showing an overall configuration example of an abnormality detection system according to the embodiment.

An embodiment of the present invention is described in detail with reference to the drawings. Moreover, the same or corresponding parts in the drawings are designated by the same reference signs, and description thereof is not repeated.

A. APPLICATION EXAMPLE

First, an example of a case in which the present invention is applied is described.

A function configuration example of a control system capable of executing abnormality detection processing according to the embodiment is described. In the following description, because the description mainly focuses on the abnormality detection processing performed by the control system, the overall control system is also referred to as an "abnormality detection system".

First, an overall configuration example of an abnormality detection system 1 according to the embodiment is described.

FIG. 1 is a schematic diagram showing the overall configuration example of the abnormality detection system 1 according to the embodiment. With reference to FIG. 1, the abnormality detection system 1 includes, as main components, a control apparatus 100 that controls a subject to be controlled and a support apparatus 200 that can be connected to the control apparatus 100. The abnormality detection system 1 may further include a host server 500 and a display apparatus 400 as an optional configuration.

The control apparatus 100 generates a detection result indicating whether any abnormality has occurred in a subject to be monitored included in the subject to be controlled. The control apparatus 100 may be embodied as a kind of computer such as a programmable controller (PLC).

More specifically, the control apparatus 100 is connected to a field apparatus group 10 via a first field bus 2 and is connected to one or more display apparatuses 400 via a second field bus 4. Furthermore, the control apparatus 100 is connected to the host server 500 via a local network 6. The control apparatus 100 exchanges data with the connected apparatuses via respective networks.

The control apparatus 100 has a control calculation execution engine that executes various calculations for controlling equipment and machines. In addition to the control calculation execution engine, the control apparatus 100 has an acquisition function for acquiring data acquired by the field apparatus group 10 and transferred to the control apparatus 100 (hereinafter, also referred to as "input value"). Furthermore, the control apparatus 100 also has a monitoring function for judging whether an abnormality has occurred in the subject to be controlled based on the acquired input value or the like. By implementing these functions in the control apparatus 100, the abnormality generated in the subject to be controlled can be monitored in a shorter period.

For this abnormality detection function, an abnormality detection engine 140 mounted on the control apparatus 100 provides a monitoring function, and an internal database 130 (hereinafter, also referred to as "internal DB") mounted inside the control apparatus 100 provides a storage function for various data. Details of the internal DB 130 and the abnormality detection engine 140 are described later.

In the specification, the "state value" is a term containing a value that can be observed by an arbitrary subject to be controlled (including: a subject to be monitored). The "state value" can include, for example, a physical value that can be measured by an arbitrary sensor; a ON/OFF state such as a relay, a switch, or the like; instruction values such as a position, a speed, a torque, and the like given to a servo driver by the PLC; variable values used by the PLC for the calculation; and the like.

As the first field bus 2 and the second field bus 4, preferably, a network is employed that performs a fixed-period communication in which an arrival time of data is guaranteed. EtherCAT (registered trademark) or the like is known as the network that performs this fixed-period communication.

The field apparatus group 10 includes an apparatus that collects, as an input value, the state value of the subject to be controlled or a manufacturing apparatus, a production line, and the like related to the control (hereinafter, also collectively referred to as a "field"). An input relay, various sensors, and the like are assumed as apparatuses for acquiring this state value. The field apparatus group 10 further includes an apparatus that exerts some action on the field based on an instruction value generated by the control apparatus 100 (hereinafter, also referred to as an "output value"). An output relay, a contactor, a servo driver and a servo motor, and any other actuator are assumed as this apparatus that exerts some action on the field. These field apparatus groups 10 exchange data including the input value and the output value with the control apparatus 100 via the first field bus 2.

In the configuration example shown in FIG. 1, the field apparatus group 10 includes a remote input/output (I/O) apparatus 12, a relay group 14, an image sensor 18, a camera 20, a servo driver 22, and a servo motor 24.

The remote I/O apparatus 12 includes a communication unit that communicates via the first field bus 2, and an input/output unit (hereinafter, also referred to as an "I/O unit") for acquiring the input value and outputting the output value. The input value and the output value are exchanged between the control apparatus 100 and the field via this I/O unit. FIG. 1 shows an example in which digital signals are exchanged as the input value and the output value via the relay group 14.

The I/O unit may be directly connected to the field bus. FIG. 1 shows an example in which an I/O unit 16 is directly connected to the first field bus 2.

The image sensor 18 performs image measurement processing such as pattern matching and the like on image data captured by the camera 20, and transmits a processing result to the control apparatus 100.

The servo driver 22 drives the servo motor 24 according to the output value (for example, a position instruction or the like) from the control apparatus 100.

As described above, the data is exchanged between the control apparatus 100 and the field apparatus group 10 via the first field bus 2, and these exchanged data are updated in an extremely short period of several hundreds of μsec orders to several tens of msec orders. Moreover, this update processing of the exchanged data may also be referred to as "I/O refresh processing".

The support apparatus 200 is an apparatus that supports preparations necessary for the control apparatus 100 to control the subject to be controlled. Specifically, the support apparatus 200 provides a development environment for a program executed by the control apparatus 100 (a program creation/editing tool, a parser, a compiler, or the like); a setting environment for setting parameters (configuration) of the control apparatus 100 and various devices connected to the control apparatus 100; a function of transmitting a generated user program to the control apparatus 100; a function of modifying/changing the user program or the like executed on the control apparatus 100 online; and the like.

Furthermore, the support apparatus 200 also provides a function of setting a parameter 256 and learning data 252 (details are described later) that define the abnormality detection processing performed by the abnormality detection engine 140 mounted on the control apparatus 100.

The display apparatus 400 is connected to the control apparatus 100 via the second field bus 4, receives an operation from a user, sends a command and the like corresponding to the user operation to the control apparatus 100, and graphically displays processing results and the like of the control apparatus 100.

The host server 500 is connected to the control apparatus 100 via the local network 6, and exchanges necessary data with the control apparatus 100. The host server 500 has, for example, a database function, and periodically or eventually collects data stored in the internal DB 130 of the control apparatus 100. A general-purpose protocol such as Ethernet (registered trademark) or the like may be implemented in the local network 6.

Next, a concept of "frame" is introduced as a unit section for judging whether any abnormality has occurred in the subject to be monitored included in the subject to be controlled in the abnormality detection processing according to the embodiment. In this way, in the specification, the "frame" means a unit section for judging whether any abnormality has occurred in the subject to be monitored. That is, whether any abnormality has occurred in the subject to be monitored is judged for each "frame". In the embodiment, the "frame" may be determined based on a state value arbitrarily set by the user.

Figure 2:
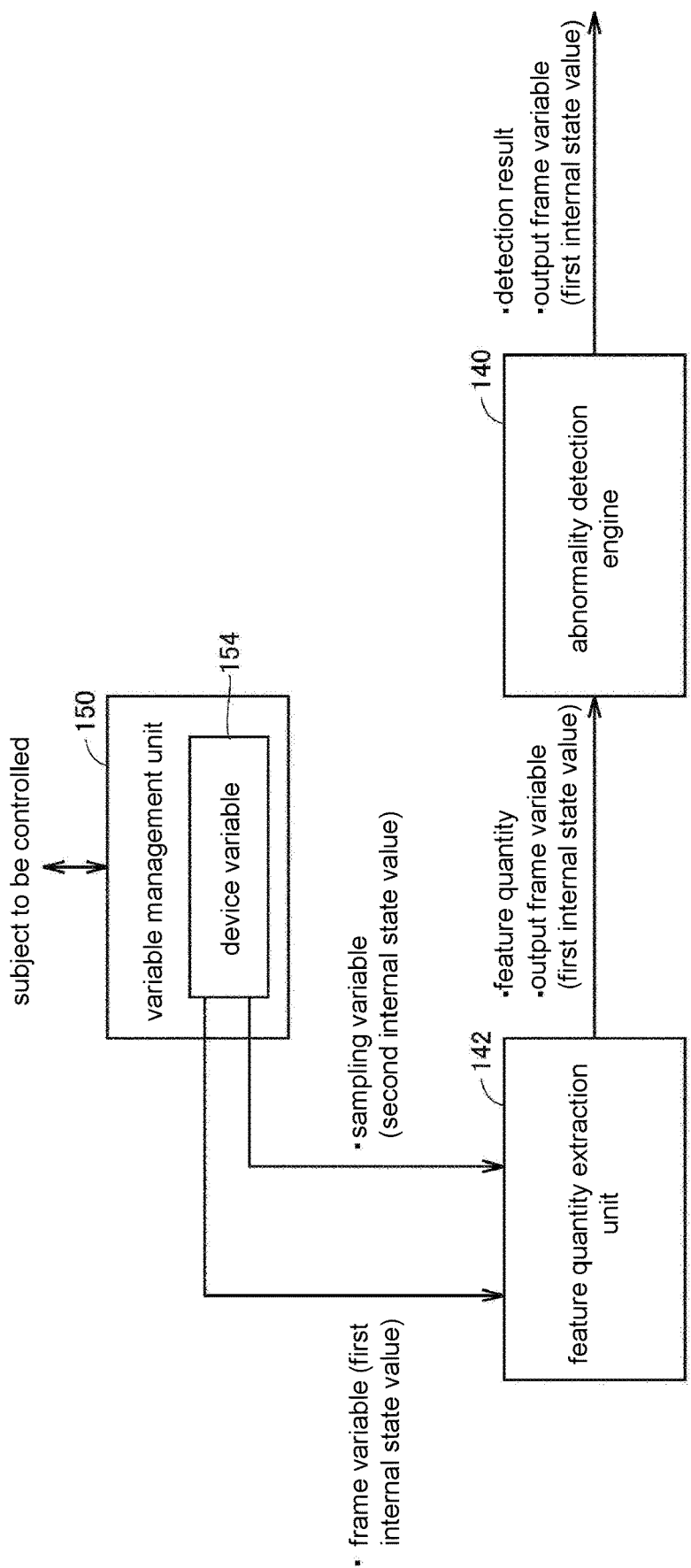
FIG. 2 is a schematic diagram showing a main part related to abnormality detection processing in a control apparatus of the abnormality detection system according to the embodiment.

FIG. 2 is a schematic diagram showing a main part related to the abnormality detection processing in the control apparatus 100 of the abnormality detection system 1 according to the embodiment. With reference to FIG. 2, the control apparatus 100 includes a variable management unit 150 corresponding to a management unit, a feature quantity extraction unit 142, and the abnormality detection engine 140 corresponding to an abnormality detection unit.

The variable management unit 150 acquires state values generated in the subject to be controlled such as a machine, an apparatus, or the like for each predetermined control period, and updates internal state values held internally.

In the control apparatus 100 according to the embodiment, for any of the state value (the input value) acquired from the subject to be controlled, the instruction value (the output value) given to the subject to be controlled, and data or values (all contained in "internal state values") used for calculation processing in the control apparatus 100 or the state management of the control apparatus 100, a form of referencing using the "variable" is employed. Therefore, in the following description, the "internal state value" that can be used in the control apparatus 100 may be expressed as a "variable value". Besides, a set of internal state values indicating the state values generated in the subject to be controlled such as a machine, an apparatus, or the like is expressed as a "device variable". That is, the variable management unit 150 acquires the state values generated in the subject to be controlled such as a machine, an apparatus, or the like for each predetermined control period, and updates the values of a device variable 154.

Moreover, the present invention is not limited to the form of referencing the value by using the "variable", but can also be applied to a form of directly designating and referencing a physical address or the like of a memory that stores each value, or other forms.

The feature quantity extraction unit 142 determines a unit section (frame) according to the value of a predetermined frame variable (any variable included in the device variable 154; corresponding to the "first internal state value"). Then, for each determined unit section (frame), the feature quantity extraction unit 142 calculates a feature quantity from a change of a predetermined sampling variable (any variable included in the device variable 154; corresponding to the "second internal state value") generated in the unit section. The feature quantity extraction unit 142 sequentially calculates the feature quantity (for example, an average value, a maximum value, a minimum value, or the like over a predetermined time) according to predetermined processing from the change of the predetermined sampling variable for each frame.

In this way, for each unit section (frame) determined according to the value of the predetermined frame variable (first internal state value), the feature quantity extraction unit 142 calculates the feature quantity from the change of the predetermined sampling variable (the second internal state value) generated in the unit section.

The abnormality detection engine 140 generates a detection result indicating whether any abnormality has occurred in the subject to be monitored included in the subject to be controlled, on the basis of the feature quantity calculated by the feature quantity extraction unit 142.

By employing the above configuration, any abnormality that may occur can be detected in an arbitrary subject to be monitored included in the subject to be controlled.

The feature quantity extraction unit 142 outputs the value of the frame variable (first internal state value) used to determine the unit section (frame) to the abnormality detection engine 140, in correspondence with the calculated feature quantity. In addition, the feature quantity extraction unit 142 outputs the value of the frame variable (first internal state value) associated with the feature quantity used for generating a detection result, in correspondence with this generated detection result. In this way, by associating the value of the frame variable (first internal state value) with the feature quantity output from the feature quantity extraction unit 142 and the detection result output from the abnormality detection engine 140, the consistency between the value of the device variable 154, the feature quantity calculated by the feature quantity extraction unit 142, and the detection result generated by the abnormality detection engine 140 can be maintained.

B. HARDWARE CONFIGURATION EXAMPLE OF EACH APPARATUS

Next, a hardware configuration example of main apparatuses configuring the abnormality detection system 1 according to the embodiment is described.

b1: Hardware Configuration Example of Control Apparatus 100

Figure 3:
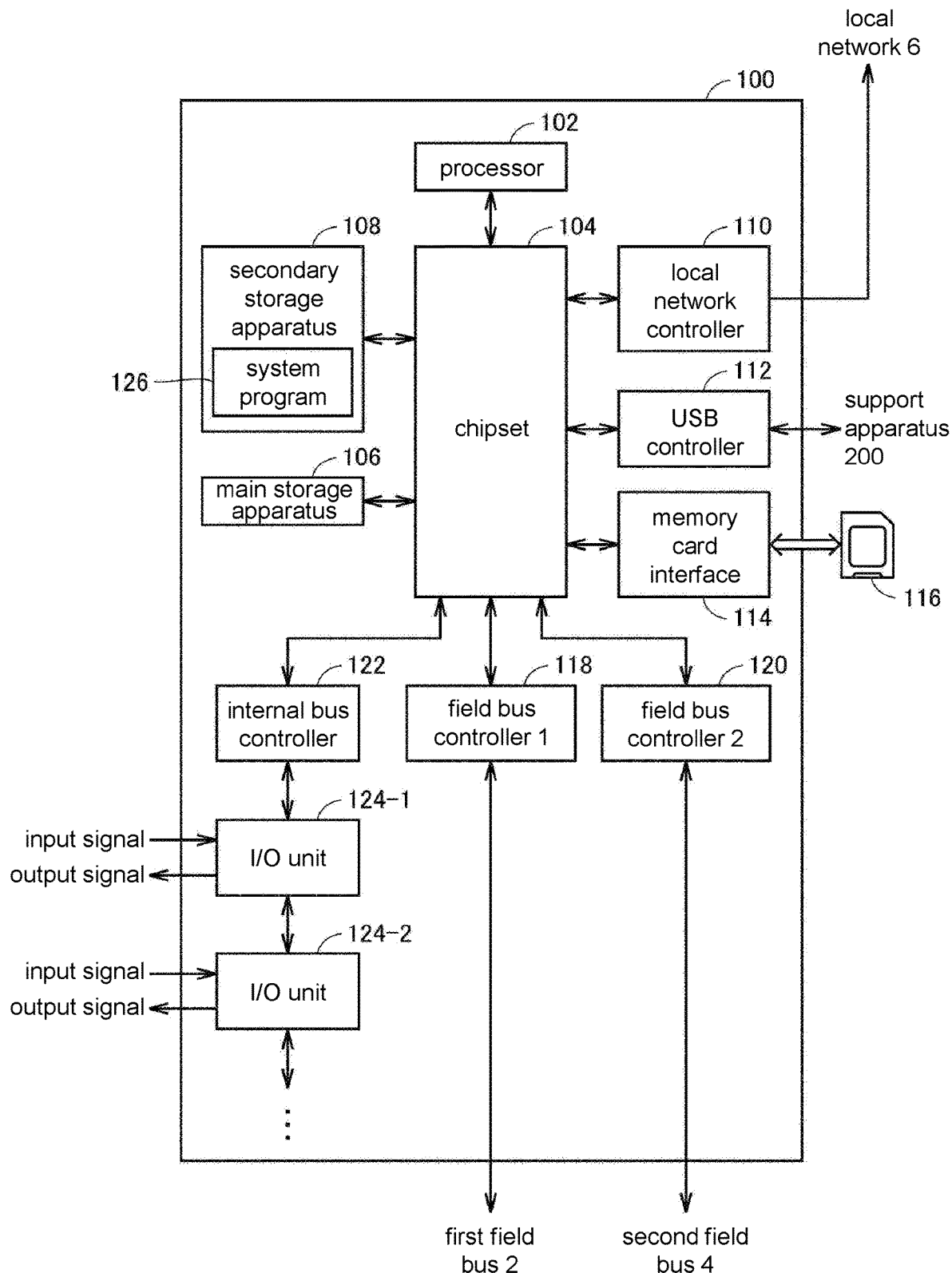
FIG. 3 is a block diagram showing a hardware configuration example of the control apparatus configuring the abnormality detection system according to the embodiment.

FIG. 3 is a block diagram showing a hardware configuration example of the control apparatus 100 configuring the abnormality detection system 1 according to the embodiment. With reference to FIG. 3, the control apparatus 100 includes: a processor 102 such as a central processing unit (CPU), a micro-processing unit (MPU), or the like; a chipset 104; a main storage apparatus 106; a secondary storage apparatus 108; a local network controller 110; a universal serial bus (USB) controller 112; a memory card interface 114; an internal bus controller 122; field bus controllers 118 and 120; and I/O units 124-1, 124-2 . . . .

The processor 102 realizes a control corresponding to the subject to be controlled, and various processes as described later by reading various programs stored in the secondary storage apparatus 108, expanding the read programs in the main storage apparatus 106, and executing the expanded programs. The chipset 104, together with the processor 102, controls each component to realize processing of the overall control apparatus 100.

In the secondary storage apparatus 108, in addition to a system program 126 (corresponding to a control program) for realizing functions provided by the control apparatus 100, a user program executed using an execution environment provided by the system program 126 is stored. The system program 126 also stores a program for realizing the internal DB 130 and the abnormality detection engine 140.

The local network controller 110 controls the exchange of data with other apparatuses via the local network 6. The USB controller 112 controls the exchange of data with the support apparatus 200 via a USB connection.

The memory card interface 114 is configured in a manner that a memory card 116 can be attached and detached. The memory card interface 114 can write data into the memory card 116, and read various data (a user program, trace data, and the like) from the memory card 116.

The internal bus controller 122 is an interface for exchanging data with the I/O units 124-1, 124-2 . . . mounted on the control apparatus 100.

The field bus controller 118 controls the exchange of data with other apparatuses via the first field bus 2. Similarly, the field bus controller 120 controls the exchange of data with other apparatuses via the second field bus 4.

FIG. 3 shows a configuration example in which the processor 102 executes a program to provide necessary functions, and some or all of these provided functions may be implemented using a dedicated hardware circuit (for example, an application specific integrated circuit (ASIC), a field-programmable gate array (FPGA), or the like). Alternatively, the main part of the control apparatus 100 may be realized using hardware (for example, an industrial personal computer based on a general-purpose personal computer) that follows a general-purpose architecture. In this case, a virtualization technology may be used to execute a plurality of operating systems (OS) having different uses in parallel, and to execute necessary applications on each OS.

b2: Hardware Configuration Example of Support Apparatus 200

Next, as an example, the support apparatus 200 according to the embodiment is realized by executing a program by using hardware (for example, a general-purpose personal computer) that follows a general-purpose architecture.

Figure 4:
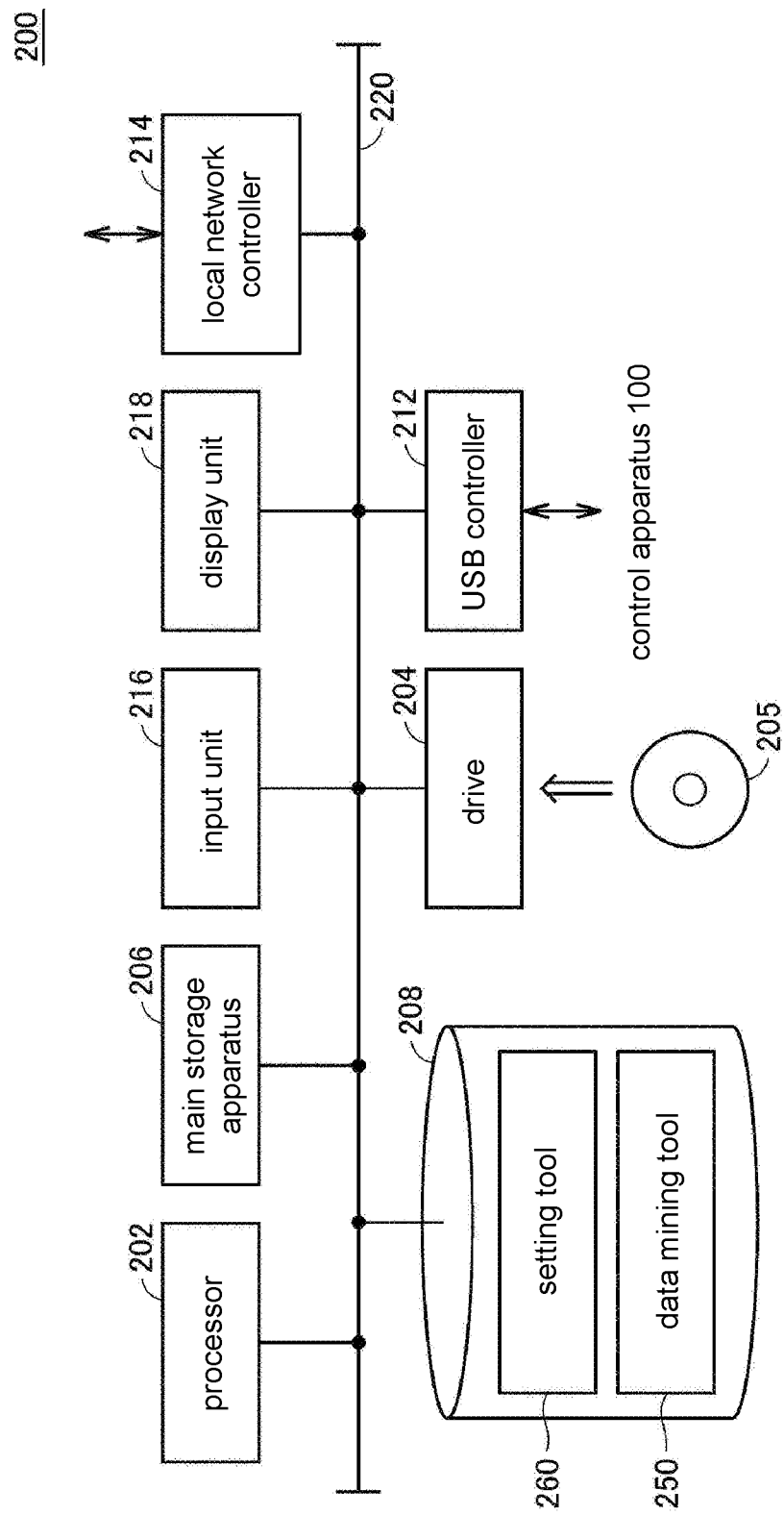
FIG. 4 is a block diagram showing a hardware configuration example of a support apparatus configuring the abnormality detection system according to the embodiment.

FIG. 4 is a block diagram showing a hardware configuration example of the support apparatus 200 configuring the abnormality detection system 1 according to the embodiment. With reference to FIG. 4, the support apparatus 200 includes: a processor 202 such as a CPU, a MPU, or the like; a drive 204; a main storage apparatus 206; a secondary storage apparatus 208; a USB controller 212; a local network controller 214; an input unit 216, and a display unit 218. These components are connected via a bus 220.

The processor 202 realizes various processes as described later by reading various programs stored in the secondary storage apparatus 208, expanding the read programs in the main storage apparatus 206, and executing the expanded programs.

The secondary storage apparatus 208 is configured by, for example, a hard disk drive (HDD), a solid state drive (SSD), or the like. The secondary storage apparatus 208 typically stores various programs including: a development program (not shown) for creating a user program executed by the support apparatus 200, debugging the created program, defining a system configuration, setting various parameters, and the like; a data mining tool 250; and a setting tool 260. The secondary storage apparatus 208 may store the OS and other necessary programs.

The drive 204 can write data into a storage medium 205 and read various data (a user program, trace data, time series data, and the like) from the storage medium 205. The storage medium 205 includes, for example, a storage medium (for example, an optical storage medium such as a digital versatile disc (DVD) or the like) that non-transiently stores a computer-readable program. From the memory card 116 or the storage medium 205, the program or data stored therein is read and then installed in an internal storage area such as the secondary storage apparatus 208 or the like.

The various programs executed by the support apparatus 200 may be installed via the computer-readable memory card 116 or the storage medium 205, or may be installed in a form of being downloaded from a server apparatus or the like on a network. In addition, the function provided by the support apparatus 200 according to the embodiment may also be realized in a form of using a part of modules provided by the OS.

The USB controller 212 controls the exchange of data with the control apparatus 100 via a USB connection. The local network controller 214 controls the exchange of data with other apparatuses via an arbitrary network.

The input unit 216 is configured by a keyboard, a mouse, and the like, and receives user operations. The display unit 218 is configured by a display, various indicators, and the like, and outputs processing results and the like from the processor 202. A printer may be connected to the support apparatus 200.

FIG. 4 shows a configuration example in which the processor 202 executes a program to provide necessary functions, and some or all of these provided functions may be implemented using a dedicated hardware circuit (for example, an ASIC, a FPGA, or the like).

C. SOFTWARE CONFIGURATION EXAMPLE/FUNCTION CONFIGURATION EXAMPLE

Next, a software configuration example and a function configuration example of main apparatuses configuring the abnormality detection system 1 according to the embodiment are described.

Figure 5:
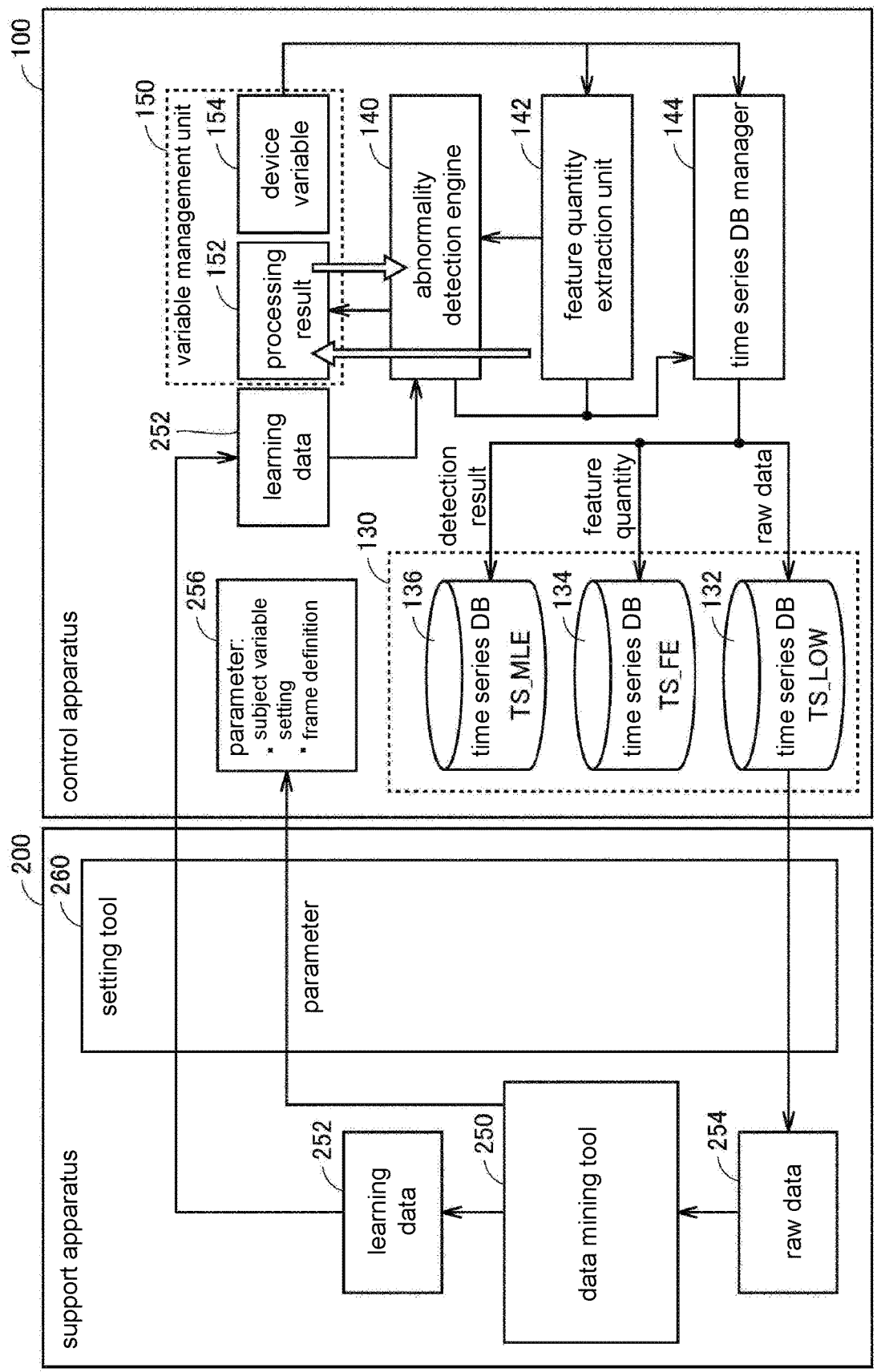
FIG. 5 is a block diagram showing a software configuration example of the abnormality detection system according to the embodiment.

FIG. 5 is a block diagram showing the software configuration example of the abnormality detection system 1 according to the embodiment.

With reference to FIG. 5, the abnormality detection processing of the abnormality detection system 1 is realized in cooperation with the control apparatus 100 and the support apparatus 200. The control apparatus 100 judges whether there is an abnormality on the basis of state values acquired from the subject to be controlled for each predetermined control period.

More specifically, the control apparatus 100 includes, as main function configurations, the internal DB 130, the abnormality detection engine 140, the feature quantity extraction unit 142, a time series database manager 144, and the variable management unit 150.

The abnormality detection engine 140 is a part that mainly executes the abnormality detection processing. According to the parameter 256 set by the support apparatus 200, the abnormality detection engine 140 calculates a value (score) indicating a possibility that any abnormality has occurred in the subject to be monitored based on a feature quantity (usually, a plurality of types of feature quantities are used) given by the feature quantity extraction unit 142 and the learning data 252 set by the support apparatus 200, and the abnormality detection engine 140 judges whether an abnormality has occurred in the subject to be monitored based on whether the calculated score value is within a predetermined threshold range. The threshold range may be defined based on one or more threshold values. In addition, a plurality of threshold ranges (for example, a caution level and a damage level) may be set. The abnormality detection engine 140 outputs, to the time series database manager 144, a detection result indicating whether an abnormality has occurred in the subject to be monitored. In addition, a processing result 152 that includes the detection result, which is output by the abnormality detection engine 140 and indicates whether an abnormality has occurred in the subject to be monitored, is output to the variable management unit 150 and is periodically updated as an internal state value. The parameter 256 includes the setting of a subject variable used for the abnormality detection processing, and a frame definition for identifying a frame ID and the like described later.

According to the parameter 256 set by the support apparatus 200, the feature quantity extraction unit 142 cyclically calculates a feature quantity (for example, an average value, a maximum value, a minimum value, or the like over a predetermined time) according to predetermined processing from a value indicated by a device variable (sampling variable) of a designated subject. The feature quantity extraction unit 142 outputs the calculated feature quantity to the abnormality detection engine 140 and the time series database manager 144.

The time series database manager 144 writes the value (raw data) of the device variable 154 updated by the variable management unit 150 for each control period, the feature quantity calculated by the feature quantity extraction unit 142 for each control period, and the detection result output from the abnormality detection engine 140, into the internal DB 130 for each control period.

The internal DB 130 corresponds to a storage unit and includes a raw data time series DB 132 for storing the raw data in time series, a feature quantity time series DB 134 for storing the feature quantities in time series, and a detection result time series DB 136 for storing the detection results in time series.

The "raw data" basically means a state value acquired from the subject to be controlled or the subject to be monitored (moreover, including a case in which a unit conversion to a physical quantity or the like is performed).

The learning data 252 is a data set used by the abnormality detection engine 140 to calculate the value (the score) indicating the possibility that any abnormality has occurred in the subject to be monitored, and basically includes a feature quantity calculated based on a state value in a "normal" case and/or a feature quantity calculated based on a state value in an "abnormal" case. The abnormality detection engine 140 refers to the learning data 252 prepared in advance and calculates the score, which is the value indicating the possibility that any abnormality has occurred in the subject to be monitored, from the feature quantity calculated by the feature quantity extraction unit 142.

As an example, a method of calculating the score corresponding to an input value based on the degree of deviation of the input value with respect to a normal value group in a hyperspace is employed as an algorithm of abnormality detection in the abnormality detection engine 140. In this case, the learning data 252 represents the normal value group in the hyperspace, which corresponds to a "model" indicating a subject to be monitored.

As this method of abnormality detection based on the degree of deviation, known are a method of detecting an abnormality based on the shortest distance from each point to a normal value group (k-nearest neighbor method), a local outlier factor (LoF) method of evaluating distance including a cluster containing the normal value group, an isolation forest (iForest) method of using a score calculated from a path length, and the like.

When the method of abnormality detection based on the degree of deviation is employed, the learning data 252 includes a group of feature quantities obtained in the normal case, and the abnormality detection engine 140 calculates the score which is the value indicating the possibility that any abnormality has occurred in the subject to be monitored based on the degree of deviation of the feature quantity of a subject with respect to the group of feature quantities included in the learning data 252.

In addition to the value of the device variable 154, the variable management unit 150 updates the value of the processing result 152 obtained from the abnormality detection engine 140 into a latest value for each control period. That is, the variable management unit 150 executes at least a part of processes related to the I/O refresh processing, and updates the input value acquired from the subject to be controlled and the output value given to the subject to be controlled for each control period.

On the other hand, the support apparatus 200 provides the control apparatus 100 with the parameter 256 and the learning data 252 for realizing the abnormality detection processing in the control apparatus 100.

More specifically, the support apparatus 200 includes the data mining tool 250 and the setting tool 260 as main function configurations.

The data mining tool 250 acquires raw data 254 (time series data) stored in the internal DB 130 (mainly the raw data time series DB 132) of the control apparatus 100, and supports an exploration of the device variables, the feature quantities, and the like suitable for the abnormality detection in the subject to be monitored. That is, the user uses the data mining tool 250 to analyze the raw data 254 which is the time series data of the device variable related to the subject to be monitored, and thereby the user determines the device variable suitable for abnormality detection in the subject to be monitored and the feature quantity of the device variable. Then, the data mining tool 250 generates the learning data 252 from the raw data 254 and determines the corresponding parameter 256 according to the determined device variable and the feature quantity thereof.

The setting tool 260 functions as an interface with the control apparatus 100, acquires the raw data 254 from the control apparatus 100, and sets the learning data 252 and the parameter 256 generated by the data mining tool 250 to the control apparatus 100.

D. REAL TIME PROCESSING IN CONTROL APPARATUS 100

In the abnormality detection system 1 according to the embodiment, whether there is an abnormality in real time is judged in a manner that the abnormality detection processing is included in the control calculation periodically executed by the control apparatus 100.

The abnormality detection processing according to the embodiment mainly includes: (1) the I/O refresh processing executed in the variable management unit 150; (2) the feature quantity extraction processing executed by the feature quantity extraction unit 142; and (3) the processing of score calculation and threshold value judgment executed by the abnormality detection engine 140.

On the other hand, in the control apparatus 100, because the processes (1) to (3) are executed at different control timings, it is necessary to maintain the consistency of the data processed in each processing.

In the control apparatus 100 of the abnormality detection system 1 according to the embodiment, the processing is executed according to a time scheduling method.

Figure 6:
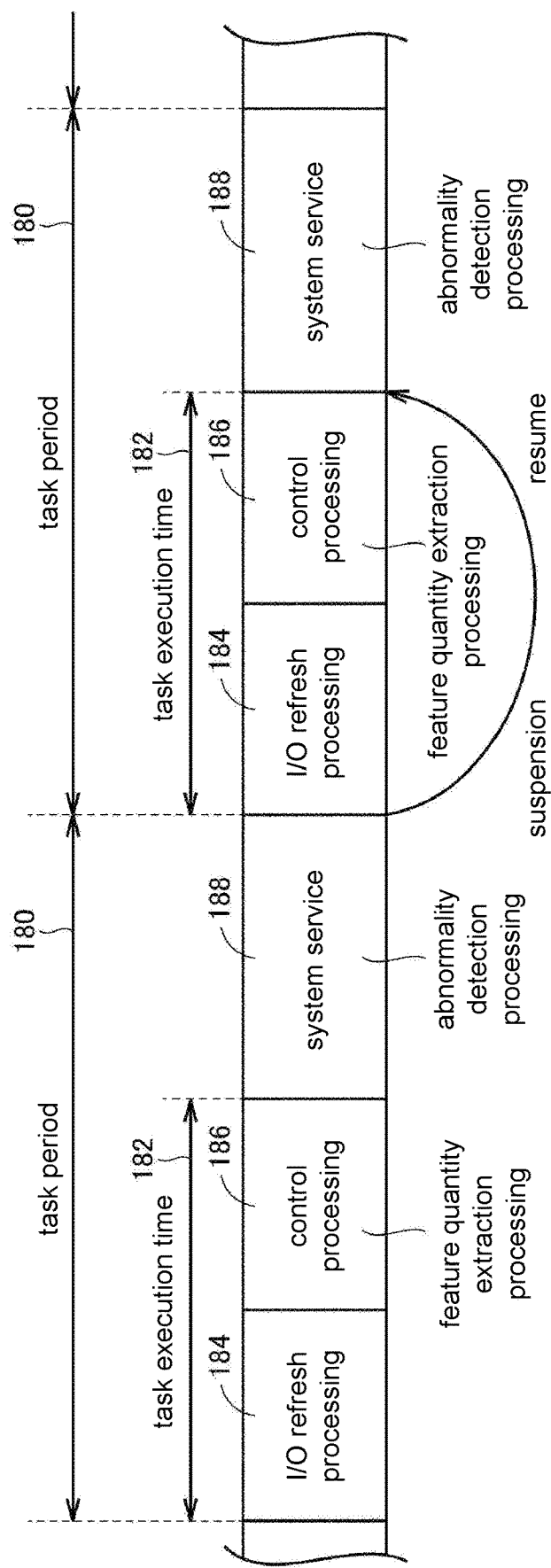
FIG. 6 is a schematic diagram showing an execution timing of control processing in the control apparatus of the abnormality detection system according to the embodiment.

FIG. 6 is a schematic diagram showing an execution timing of the control processing in the control apparatus 100 of the abnormality detection system 1 according to the embodiment. With reference to FIG. 6, in the control apparatus 100, the execution of processing is managed in a unit of a task period 180 which is a predetermined control period.

In each task period 180, I/O refresh processing 184, control processing 186, and a system service 188 are mainly executed.

The I/O refresh processing 184 corresponds to the I/O refresh processing executed in the variable management unit 150 (FIG. 5).

The control processing 186 includes processing related to a system of the control apparatus 100 and a user program (typically, a sequence program including a combination of sequence commands, a motion program including a combination of motion commands, or the like). The feature quantity extraction processing executed by the feature quantity extraction unit 142 is included in the control processing 186.

The system service 188 is a general term for programs executed in a duration in which the I/O refresh processing 184 and the control processing 186 are not executed in each task period 180, and the system service 188 includes communication processing between the control apparatus 100 and an external apparatus, and processing such as file access to the memory card 116 and the like. The processing of score calculation and threshold value judgment by the abnormality detection engine 140 is included in the system service 188.

The I/O refresh processing 184 and the control processing 186 are registered as primary fixed-period tasks having the highest execution priority, and are executed with the highest priority in each task period 180. In each task period 180, all processes of the I/O refresh processing 184 and the control processing 186 are executed. The time required to execute the I/O refresh processing 184 and the control processing 186 in each task period 180 is referred to as a task execution time 182.

On the other hand, because the system service 188 is executed in free time in each task period 180, there is also a case that not all processes can be completed. In addition, the system service 188 includes processing that is less necessary to complete the execution of all the processes in each task period 180.

Therefore, when the processing included in the system service 188 (including the processing of score calculation and threshold value judgment by the abnormality detection engine 140) is executed in a certain task period 180, if the start of a next task period 180 arrives, the processing is temporarily interrupted. Besides, the processing is executed if there is free time in any task period 180. Accordingly, the execution of the system service 188 depends on the free time in the task period 180.

As shown in FIG. 6, (1) the I/O refresh processing executed in the variable management unit 150 and (2) the feature quantity extraction processing executed by the feature quantity extraction unit 142 are cyclically executed for each task period 180. However, the execution timings of the I/O refresh processing and the feature quantity extraction processing are different.

In addition, (3) the processing of score calculation and threshold value judgment by the abnormality detection engine 140 is executed over a plurality of task periods 180. Therefore, a construction for synchronizing data between the processes (1) to (3) is required.

In addition, there may be data in which values change over the plurality of task periods 180 in the control processing. It is necessary to reliably collect the data over the plurality of task periods 180, and process and store the values. Particularly, because the processing of score calculation and threshold value judgment by the abnormality detection engine 140 is executed over the plurality of task periods 180, the processing cannot be synchronized.

When the abnormality detection processing is executed in real time in the control apparatus 100, it is necessary to consider the integrity of data or the consistency of data as described above.

E. MAINTAINING OF CONSISTENCY OF DATA

Next, in the abnormality detection system 1 according to the embodiment, identification information for maintaining the consistency of data is introduced. This identification information is also referred to as "frame ID" below. The frame ID is identification information for identifying a data unit used for the abnormality detection processing.

By introducing this frame ID which is the identification information, the unit section to be a subject can be identified by the abnormality detection processing, and omission (dropout) and the like of the abnormality detection processing can be detected for some reason.

As the frame ID, any variable that can be referred to by the user program executed by the control apparatus 100 can be used. It is assumed that the variable used as the frame ID is not set on the control apparatus 100 side but arbitrarily set on the user side. That is, the abnormality detection engine 140 of the control apparatus 100 receives the designation of an arbitrary device variable 154 (internal state value) as the frame variable (first internal state value).

The variable used as the frame ID is preferably a variable that changes each time according to the operation of a machine or an apparatus which is the subject to be controlled. The following information can be used as the frame ID.

(1) A serial number of workpieces processed by the subject to be controlled;
(2) The total number of the workpieces processed after the power of a machine or an apparatus which is the subject to be controlled is turned on;
(3) A cumulative number of operation cycles or operation cycle number of an operation mechanism included in the subject to be controlled (for example, the number of counts in an apparatus where a roller counts 1 every 100 rotations);

By using this frame ID, the processing time of data synchronization processing and data exclusive processing, a file management, and the like can be reduced, and the processing can be sped up.

Moreover, instead of using the frame ID used in the abnormality detection system 1 according to the embodiment, a form of processing by dividing the data for each predetermined time (for example, every 1 second) is also assumed. However, there is no guarantee for operating by dividing the time with high precision in the machine or the apparatus included in the subject to be controlled (for example, a timing shift of material input and a position shift due to friction), and it is necessary to detect an abnormality caused by the time shift. Alternatively, even if the time shift itself is not abnormal, the data of periodic unit sections of the subject to be controlled is not always possible to be used for highly precise abnormality detection.

Figure 7:
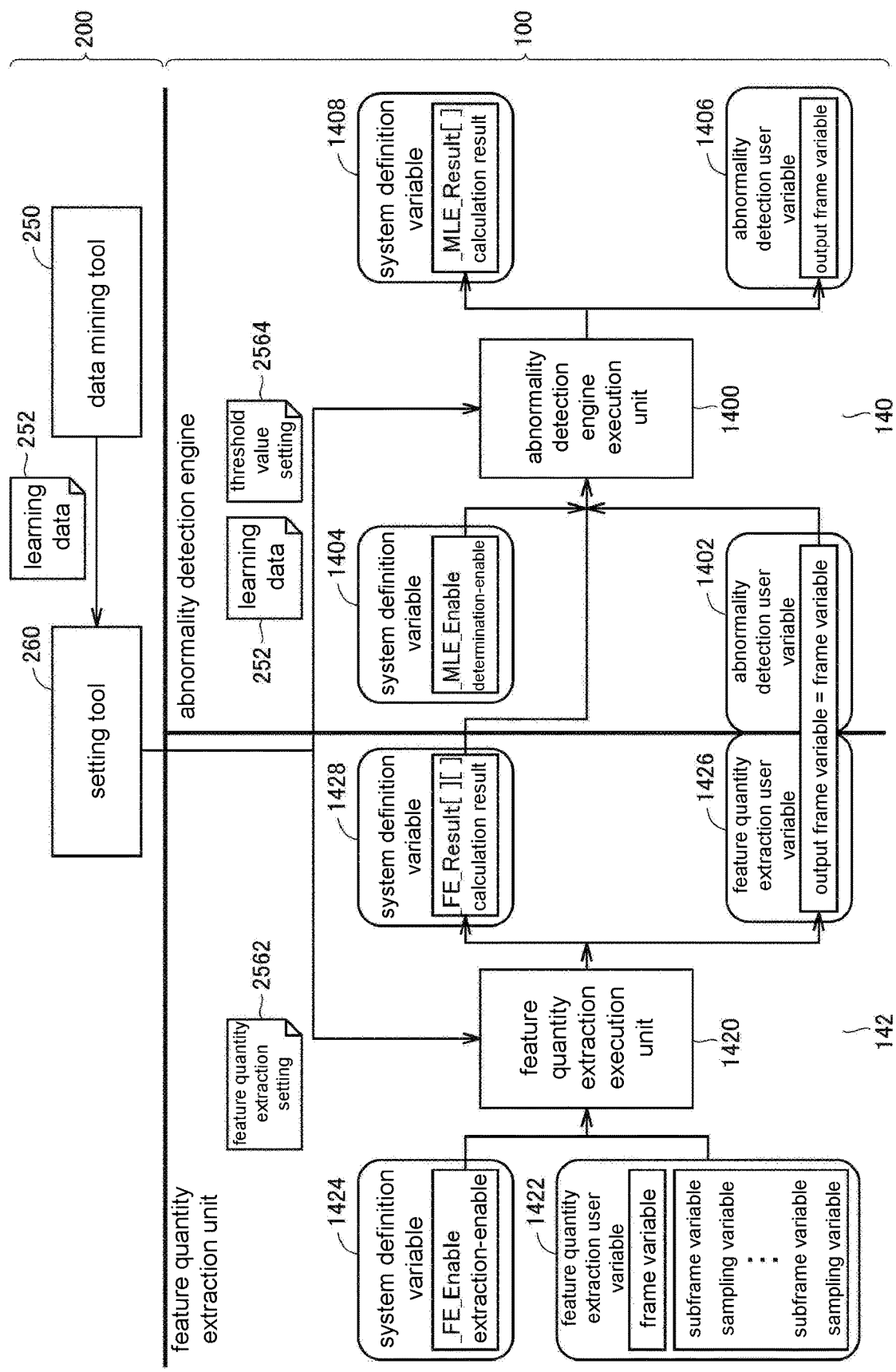
FIG. 7 is a schematic diagram showing a relationship of variables used for the abnormality detection processing in the abnormality detection system according to the embodiment.

FIG. 7 is a schematic diagram showing the relationship of the variables used in the abnormality detection processing in the abnormality detection system 1 according to the embodiment. With reference to FIG. 7, the abnormality detection engine 140 and the feature quantity extraction unit 142 are mounted on the control apparatus 100. The learning data 252 generated by the data mining tool 250 of the support apparatus 200 is provided to the control apparatus 100 via the setting tool 260.

The feature quantity extraction unit 142 is realized by executing commands specified in a feature quantity extraction execution unit 1420 executed as a primary fixed-period task. A feature quantity extraction user variable 1422 and a system definition variable 1424 are input to the feature quantity extraction execution unit 1420. In the feature quantity extraction execution unit 1420, one or more feature quantities are calculated by a calculation method which is defined by a feature quantity extraction setting 2562 included in the parameter 256, with respect to sampling variables (device variables) contained in the feature quantity extraction user variable 1422.

The feature quantity extraction user variable 1422 includes one or more sampling variables used to calculate the feature quantity. Subframe variables for identifying a partial section used to calculate the feature quantity are respectively associated with each of the sampling variables. That is, the feature quantity extraction user variable 1422 includes one or more pairs of the subframe variables and the sampling variables. Moreover, a processing method using the subframe variables is described later.

The feature quantity extraction user variable 1422 further includes a frame variable used as a frame ID. A value indicated by the frame variable is used as information for identifying a data unit (a specific section of time series data) input to the feature quantity extraction execution unit 1420.

A value stored in the system definition variable 1424 is used as a trigger or a condition for the feature quantity extraction execution unit 1420 to start the processing.

A calculation result of the feature quantity extraction execution unit 1420 is output as a feature quantity extraction user variable 1426 and a system definition variable 1428.

In the feature quantity extraction user variable 1426, a value the same as the frame variable (a value indicated as the frame ID) for identifying the data unit used for the calculation processing of the feature quantity in the feature quantity extraction execution unit 1420 is stored as an output frame variable. The value stored as the output frame variable is referred to in the processing in the abnormality detection engine 140 described later.

The system definition variable 1428 stores the feature quantity that is the calculation result of the feature quantity extraction execution unit 1420. Typically, an array or structure body is used as the system definition variable 1428, and when a plurality of feature quantities are calculated, each feature quantity is stored in the form of a multidimensional data structure.

As shown in FIG. 7, the calculation results (the feature quantity extraction user variable 1426 and the system definition variable 1428) of the feature quantity extraction unit 142 are internally held as internal state values (variable values) managed by the variable management unit 150. Moreover, the feature quantity extraction user variable 1422 and the system definition variable 1424 referred to by the feature quantity extraction unit 142 are also internally held as internal state values (variable values) managed by the variable management unit 150. These internal state values (variable values) managed by the variable management unit 150 can be arbitrarily referred to from the user program and the like executed by the control apparatus 100.

The abnormality detection engine 140 is realized by executing commands specified in an abnormality detection engine execution unit 1400 executed as a system service. An abnormality detection user variable 1402, the system definition variable 1428, and a system definition variable 1404 are input to the abnormality detection engine execution unit 1400.

The abnormality detection user variable 1402 stores the calculation result of the feature quantity extraction execution unit 1420, and the abnormality detection engine execution unit 1400 can refer to the feature quantity calculated by the feature quantity extraction execution unit 1420.

The abnormality detection user variable 1402 stores a frame variable for identifying the data unit used to calculate the feature quantity used in the processing performed by the abnormality detection engine execution unit 1400. The frame variable stored in the abnormality detection user variable 1402 has the same value as the output frame variable stored in the feature quantity extraction user variable 1426. That is, a value same as the value indicated by the frame variable output from the feature quantity extraction execution unit 1420 can be given as the frame variable of the abnormality detection engine execution unit 1400. In this way, the value of the frame variable (the first internal state value) output by the feature quantity extraction unit 142 is input to the abnormality detection engine 140.

A value stored in the system definition variable 1404 is used as a trigger or condition for the abnormality detection engine execution unit 1400 to start the processing.

A calculation result of the abnormality detection engine execution unit 1400 is output as an abnormality detection user variable 1406 and a system definition variable 1408.

In the abnormality detection user variable 1406, a value the same as the frame variable (a value indicated as the frame ID) for identifying the data unit used for the processing in the abnormality detection engine execution unit 1400 is stored as an output frame variable.

The system definition variable 1408 stores the feature quantity that is the calculation result of the abnormality detection engine execution unit 1400. Typically, an array or structure body is used as the system definition variable 1408. The system definition variable 1408 stores a score calculated based on the learning data 252 and the feature quantity in the abnormality detection engine execution unit 1400, and a detection result which indicates whether there is an abnormality and is determined by comparing the calculated score with a threshold value setting 2564 included in the parameter 256.

As shown in FIG. 7, the calculation results (the abnormality detection user variable 1406 and the system definition variable 1408) of the abnormality detection engine 140 are internally held as internal state values (variable values) managed by the variable management unit 150. Moreover, the abnormality detection user variable 1402, the system definition variable 1428, and the system definition variable 1404 referred to by the abnormality detection engine 140 are also internally held as internal state values (variable values) managed by the variable management unit 150. These internal state values (variable values) managed by the variable management unit 150 can be arbitrarily referred to from the user program and the like executed by the control apparatus 100.

As described above, the consistency of data can be maintained by sharing the same frame ID (the frame variable) between the feature quantity extraction unit 142 and the abnormality detection engine 140.

F. FRAME AND SUBFRAME

Next, the frames and the subframes in the abnormality detection system 1 according to the embodiment, and the processing for maintaining the consistency of data using the frame variables are described.

Figure 8:
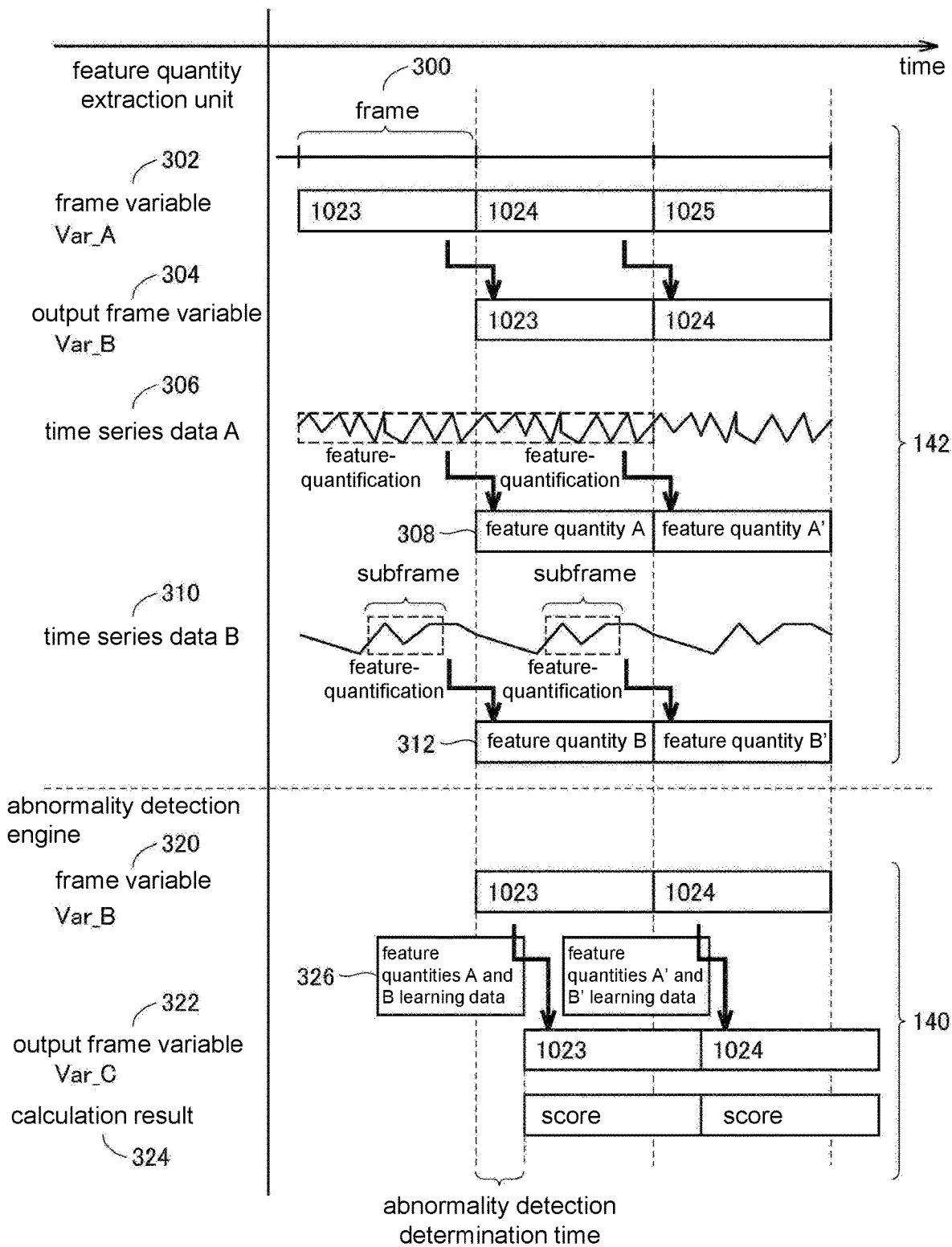
FIG. 8 is a time chart for illustrating processing related to frame management in the control apparatus of the abnormality detection system according to the embodiment.

FIG. 8 is a time chart for illustrating processing related to a frame management in the control apparatus 100 of the abnormality detection system 1 according to the embodiment.

With reference to FIG. 8, the abnormality detection processing is executed in units of frames. The frame is usually defined as spanning a plurality of control periods. That is, the frame can also be defined as a unit that collectively manages the plurality of control periods.

More specifically, a frame 300 can be set using a frame variable 302 arbitrarily set by a user. In an example shown in FIG. 8, a variable Var_A is set as the frame variable 302. For example, the variable Var_A used as the frame variable 302 indicates the lot number or the like of a workpiece which is a subject to be processed.

The feature quantity extraction unit 142 of the control apparatus 100 determines a section in which the frame variable (the first internal state value) shows the same value as a frame (a unit section).

With respect to the processing in the feature quantity extraction unit 142, one or more feature quantities are calculated from one or more pieces of time series data (that is, a temporal change of a value designated as a sampling variable) for each frame 300 set by the frame variable 302. In the example shown in FIG. 8, an example is shown in which a feature quantity 308 (a feature quantity A) is sequentially calculated from time series data 306 (time series data A) of the unit section corresponding to each frame, and a feature quantity 312 (a feature quantity B) is sequentially calculated from series data 310 (time series data B) of the unit section corresponding to each frame.

An output frame variable 304 is associated with the feature quantities 308 and 312 calculated respectively. In the example shown in FIG. 8, a variable Var_B is set as the output frame variable 304, and the value of the variable Var_A, which is the frame variable 302, is set with respect to the variable Var_B.

In this way, the same as the "frame ID" (the variable Var_A which is the frame variable 302) applied to the time series data used for calculating this feature quantity, the "frame ID" (the variable Var_B which is the output frame variable 304) is applied to the feature quantity calculated sequentially. That is, the calculation of the feature quantity is delayed by at least one frame, but even if this time delay exists, the consistency of data can be maintained using the "frame ID".

Furthermore, in the abnormality detection engine 140, the output frame variable 304 output by the processing performed by the feature quantity extraction unit 142 is directly used as a frame variable 320 (the variable Var_B in the example).

With respect to a feature quantity set 326 (including the feature quantity A and the feature quantity B in the example) to which a value the same as the value indicated by the frame variable 320 is applied, the abnormality detection processing is executed, and calculation results 324 such as a score and the like are calculated. An output frame variable 322 is associated with each of the calculation results 324. In the example shown in FIG. 8, a variable Var_C is set as the output frame variable 322, and with respect to the variable Var_C, the value of the variable Var_B which is the frame variable 320 is set.

Moreover, a delay may occur by a predetermined abnormality detection determination time from the input of the feature quantity set 326 to the calculation of the calculation results 324 such as the score and the like. Even if there is a delay of the abnormality detection determination time, the consistency of data can be maintained using the frame ID.

As described above, the user uses the variable set arbitrarily (basically, any one of the variables that can be referred to by the user program executed by the control apparatus 100) as a key to generate or calculate the frame ID over a plurality of control periods, and the consistency (in other words, the traceability of data) can be maintained for data generated or calculated at different timings.

Next, the subframe that can be set in the frame is described. As described above, the feature quantity is calculated from the time series data of each frame, but there is also a case that the feature quantity is desired to be calculate only from time series data of a specific section in each frame.

For example, when the variable indicating the lot number of the subject workpiece is set as a frame variable, the processing may also be executed in a plurality of processes for each workpiece. In this case, the feature quantity is usually desired to be calculate based on a change of the state value that appears in a specific process.

Thus, in the embodiment, a subframe can be set for each frame, and the feature quantity can be calculated based on the time series data in a section of the set subframe. The subframe may be set for each feature quantity.

Figure 9:
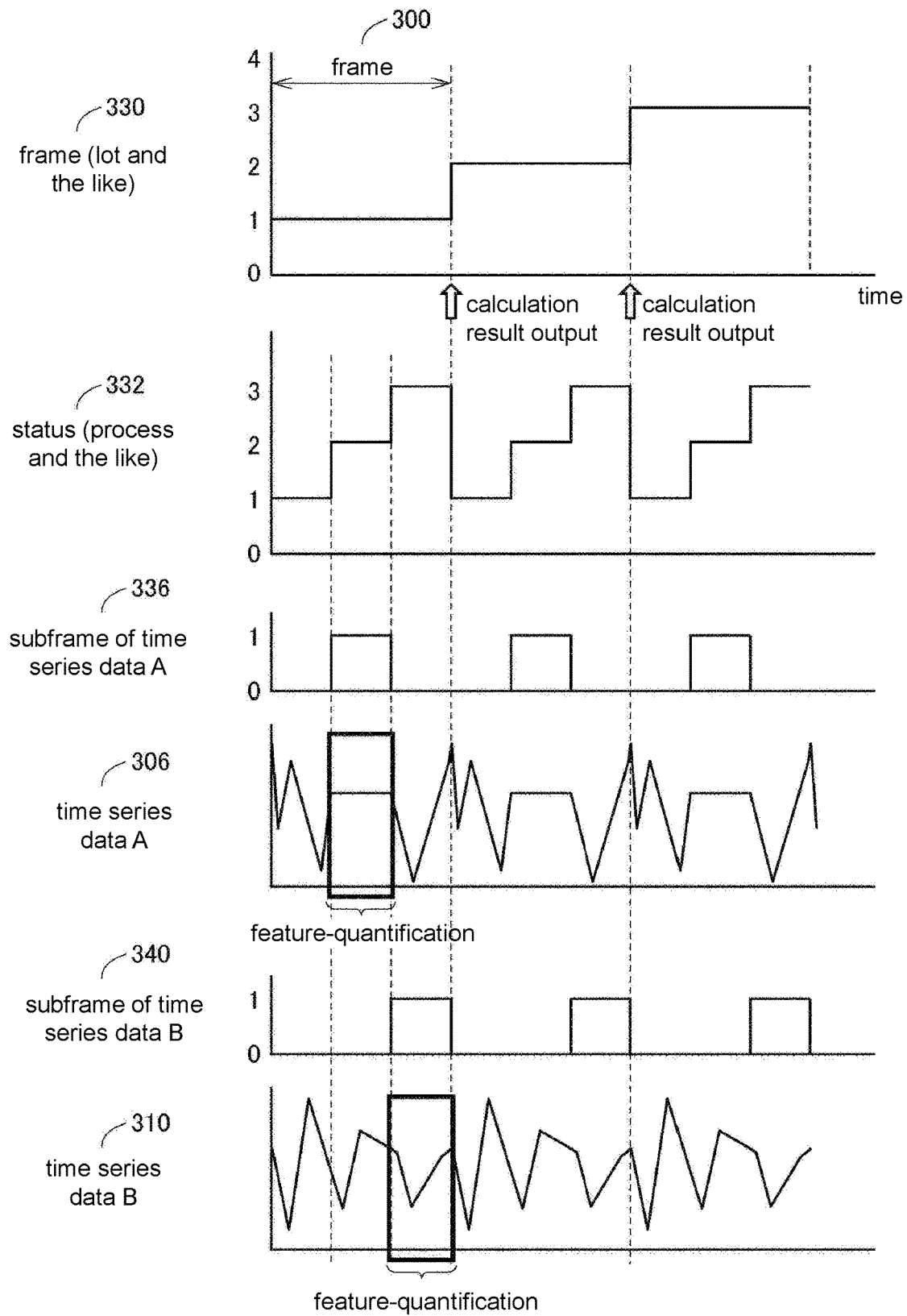
FIG. 9 is a time chart for illustrating the subframe shown in FIG. 8.

FIG. 9 is a time chart for illustrating the subframe shown in FIG. 8. A case is assumed that the variable indicating the lot number or the like is set as a frame 330 with reference to FIG. 9. The calculation result in each frame 330 is output at the end timing of each frame 330. In the example shown in FIG. 9, each frame 330 includes three processes, and a status 332 indicating which process the processing is in can be referred to.

The status 332 can be set as a subframe for identifying a subject for which the feature quantity is calculated. For example, the time series data 306 and 310 (the time series data A and B) are assumed as subjects for which the feature quantity is calculated. For the time series data 306, the feature quantity is calculated from a partial section of a second process (the value of the status 332 is "2"); and for the time series data 310, the feature quantity is calculated from a partial section of a third process (the value of the status 332 is "3").

In this case, a partial section in which the value of the status 332 shows "2" may be set as a subframe 336 (a subframe of the time series data A) of the time series data A, and a partial section in which the value of the status 332 shows "3" may be set as a subframe 340 (a subframe of the time series data B) of the time series data B.

In this way, for each frame variable (unit section), the feature quantity extraction unit 142 of the control apparatus 100 calculates the feature quantity from a change of the sampling variable (the second internal state value) in a partial section in which the predetermined subframe variable (the third internal state value) shows the predetermined value in this frame.

As shown in FIG. 9, by limiting the section for which the feature quantity is calculated to a part of the section in the frame, more precise abnormality detection processing can be realized.

G. DATA STRUCTURE

Next, a data structure that is output including the aforementioned frame ID is described.

FIG. 10 is a diagram for illustrating an example of the data structure stored in the internal DB 130 of the control apparatus 100 of the abnormality detection system 1 according to the embodiment. (a) of FIG. 10 shows an example of the time series data stored in the raw data time series DB 132 of the internal DB 130, (b) of FIG. 10 shows an example of the time series data stored in the feature quantity time series DB 134 of the internal DB 130, and (c) of FIG. 10 shows an example of the time series data stored in the detection result time series DB 136 of the internal DB 130. The time series data shown in FIG. 10 uses, for example, the maximum value of the variable Var_1 which is the subject to be monitored as a feature quantity.

Moreover, the internal DB 130 does not have to store all the time series data shown in (a) to (c) of FIG. 10, and may store only a part of the time series data.

Each record of the time series data stored in the raw data time series DB 132 shown in (a) of FIG. 10 includes time information 1320, a variable value 1322, and a frame ID 1324. Each record of the time series data stored in the feature quantity time series DB 134 shown in (b) of FIG. 10 includes time information 1340, a frame ID 1342, and a feature quantity 1344. Each record of the time series data stored in the detection result time series DB 136 shown in (c) of FIG. 10 includes time information 1360, a frame ID 1362, and a score 1364.

In this way, the internal DB 130 of the control apparatus 100 stores at least one of the time series data of the feature quantity associated with the value of the frame variable (the first internal state value) and the time series data of the detection result associated with the value of the frame variable (the first internal state value).

As shown in (a) to (c) of FIG. 10, by using the common frame ID, the consistency can be maintained between the data generated or calculated at different timings. By using the frame ID in this way, the consistency of the processing executed by the control apparatus 100 and the data, and the correspondence between the records included in the data stored in the internal DB 130 can be easily realized. In addition, by using, as the frame ID, a value that changes according to a predetermined regularity such as monotonically increasing or monotonically decreasing (increment or decrement), omission (dropout) and the like of the abnormality detection processing can be detected.

FIG. 11 is a diagram showing an example of time series data which is obtained by combining each time series data shown in FIG. 10. With reference to FIG. 11, each record of the combined time series data includes the frame ID 1324 (1342, 1362), the time information 1320 (1340, 1360), the variable value 1322, the feature quantity 1344, and the score 1364.

As shown in FIG. 11, by combining the three types of time series data using the frame ID as a key, the raw data acquired from the subject to be monitored, the feature quantities calculated from the raw data, the scores calculated from the feature quantities, and the like can be confirmed or analyzed in the time series.

H. PROCESSING PROCEDURE

Next, a processing procedure in the abnormality detection system 1 according to the embodiment is described.

Figure 12:
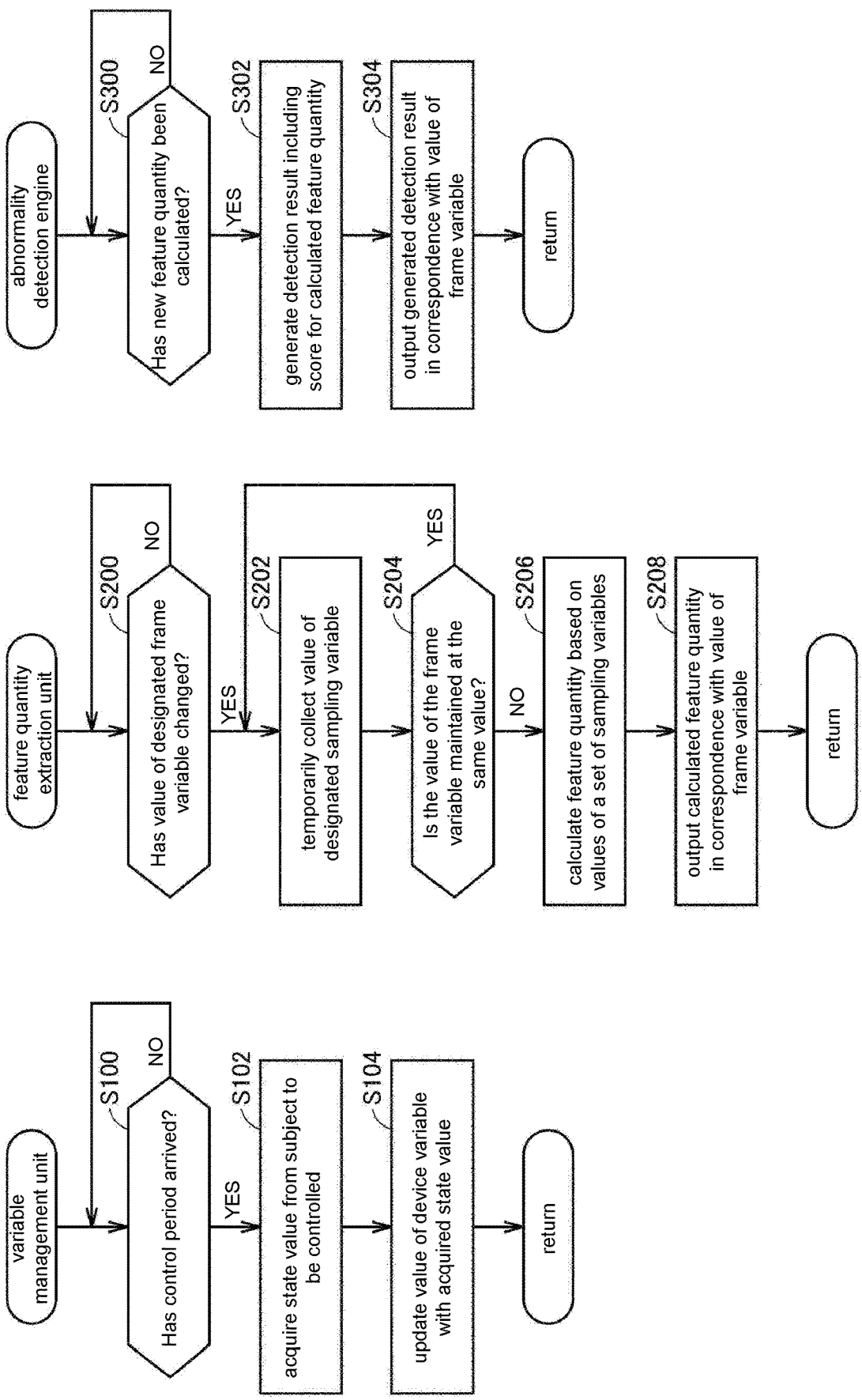
FIG. 12 is a flowchart showing a processing procedure in the abnormality detection system according to the embodiment.

FIG. 12 is a flowchart showing the processing procedure in the abnormality detection system 1 according to the embodiment. In FIG. 12, processing procedures executed by the variable management unit 150, the feature quantity extraction unit 142, and the abnormality detection engine 140 are shown. Each step shown in FIG. 12 is typically realized in a manner that the processor 102 of the control apparatus 100 executes the system program 126 (see FIG. 3) which corresponds to the control program.

First, with respect to the processing executed by the variable management unit 150, the control apparatus 100 judges whether a control period has arrived (step S100). If the control period has not arrived (NO in step S100), the processing of step S100 is repeated.

If the control period has arrived (YES in step S100), the control apparatus 100 acquires a state value from the subject to be controlled (step S102) and updates the value of the device variable 154 with the acquired state value (step S104). Then, the processing of step S100 and after this is repeated.

In this way, in the variable management unit 150, the processing of acquiring the state value generated in the subject to be controlled for each predetermined control period and updating the device variable 154 (the internal state value) held internally is executed.

Next, as the processing executed by the feature quantity extraction unit 142, the control apparatus 100 judges whether the value of a designated frame variable has changed (step S200). If the value of the frame variable has not changed (NO in step S200), the processing of step S200 is repeated.

If the value of the frame variable has changed (YES in step S200), the control apparatus 100 temporarily collects the value of the designated sampling variable (step S202).

Then, the control apparatus 100 judges whether the value of the frame variable is maintained at a same value (step S204). If the value of the frame variable is maintained at the same value (YES in step S204), the processing of step S202 and after this is repeated.

If the value of the frame variable is not maintained at the same value (NO in step S204), the control apparatus 100 calculates the feature quantity based on the values of a set of sampling variables collected in step S202 (step S206). Then, the control apparatus 100 outputs the calculated feature quantity in correspondence with the value of the frame variable (a value before the change) (step S208). Then, the processing of step S200 after this is repeated.

In this way, in the feature quantity extraction unit 142, for each frame (unit section) determined according to the value of the predetermined frame variable (the first internal state value), the processing of calculating the feature quantity from the change of the predetermined sampling variable (the second internal state value) generated in the frame is executed. Then, in the feature quantity extraction unit 142, the processing of outputting the value of the frame variable used to determine the corresponding frame (unit section) is also executed in correspondence with the calculated feature quantity.

Next, as the processing executed by the abnormality detection engine 140, the control apparatus 100 judges whether a new feature quantity has been calculated by the feature quantity extraction unit 142 (step S300). If the new feature quantity has not been calculated (NO in step S300), the processing of step S300 is repeated.

If the new feature quantity has been calculated (YES in step S300), the control apparatus 100 generates the detection result including the score for the feature quantity calculated by referring to the learning data 252 (step S302). Moreover, the value of the frame variable is associated with the new feature quantity output from the feature quantity extraction unit 142.

Then, the control apparatus 100 outputs the generated detection result in correspondence with the value of the frame variable (step S304). Then, the processing of step S300 and after this is repeated.

In this way, in the abnormality detection engine 140, the processing of generating the detection result indicating whether any abnormality has occurred in the subject to be monitored included in the subject to be controlled, on the basis of the feature quantity calculated by the feature quantity extraction unit 142, and the processing of outputting the value of the frame variable (the first internal state value) associated with the feature quantity used for generating the detection result, in correspondence with the generated detection result are executed.

I. APPENDIX

The embodiment as described above includes the following technical ideas.

[Configuration 1]

A control apparatus, including: a management unit (150) that acquires state values generated in a subject to be controlled for each predetermined control period, and updates internal state values (154) held internally;
   a feature quantity extraction unit (142) that, for each unit section (300) determined according to the value of a predetermined first internal state value (302), calculates a feature quantity (308, 312) from a change of a predetermined second internal state value (306, 310) generated in the unit section, wherein the feature quantity extraction unit outputs the value of the first internal state value used to determine the corresponding unit section in correspondence with the calculated feature quantity;
   an abnormality detection unit (140) that generates a detection result (324) indicating whether any abnormality has occurred in a subject to be monitored included in the subject to be controlled, on the basis of the feature quantity calculated by the feature quantity extraction unit, wherein the abnormality detection unit outputs the value of the first internal state value associated with the feature quantity used for generating the detection result, in correspondence with the generated detection result.

[Configuration 2]

The control apparatus according to Configuration 1, wherein the value of the first internal state value output by the feature quantity extraction unit is input to the abnormality detection unit.

[Configuration 3]

The control apparatus according to Configuration 1 or 2, wherein the feature quantity extraction unit receives a designation of an arbitrary internal state value as the first internal state value.

[Configuration 4]

The control apparatus according to any one of Configurations 1 to 3, wherein the feature quantity extraction unit determines a section in which the first internal state value shows the same value as the unit section.

[Configuration 5]

The control apparatus according to any one of Configurations 1 to 4, wherein for each unit section, the feature quantity extraction unit calculates the feature quantity from the change of the second internal state value in a partial section in which a predetermined third internal state value (332) shows a predetermined value in the unit section.

[Configuration 6]

The control apparatus according to any one of Configurations 1 to 5, wherein the abnormality detection unit refers to learning data (252) prepared in advance and calculates, from the feature quantity, a value (1364) indicating a possibility that any abnormality has occurred in the subject to be monitored.

[Configuration 7]

The control apparatus according to Configuration 6, wherein the learning data includes a group of feature quantities obtained in a normal case;
   the abnormality detection unit calculates the value indicating the possibility that any abnormality has occurred in the subject to be monitored based on a degree of deviation of the feature quantity with respect to the group of feature quantities included in the learning data.

[Configuration 8]

The control apparatus according to Configuration 6 or 7, wherein the abnormality detection unit generates a detection result indicating whether an abnormality has occurred in the subject to be monitored based on whether the value indicating the possibility that any abnormality has occurred in the subject to be monitored is within a predetermined threshold range.

[Configuration 9]

The control apparatus according to any one of Configurations 1 to 8, further including a storage unit (130) that stores at least one of time series data of the feature quantity corresponding to the value of the first internal state value and time series data of the detection result corresponding to the value of the first internal state value.

[Configuration 10]

The control apparatus according to any one of Configurations 1 to 9, wherein the management unit further internally holds calculation results of the feature quantity extraction unit and the abnormality detection unit as internal state values that can be referred to by a program executed by the control apparatus.

[Configuration 11]

A control program (126) executed by a control apparatus (100), which causes the control apparatus to perform:
   a step (S100, S102, S104) of acquiring state values generated in a subject to be controlled for each predetermined control period and updating internal state values held internally;
   a step (S200, S202, S204, S206) of, for each unit section (300) determined according to the value of a predetermined first internal state value (302), calculating a feature quantity (308, 312) from a change of a predetermined second internal state value (306, 310) generated in the unit section;

a step (S208) of outputting the value of the first internal state value used to determine the corresponding unit section in correspondence with the calculated feature quantity;

a step (S302) of generating a detection result (324) indicating whether any abnormality has occurred in a subject to be monitored included in the subject to be controlled, on the basis of the calculated feature quantity; and a step (S304) of outputting the value of the first internal state value associated with the feature quantity used for generating the detection result, in correspondence with the generated detection result.

J. ADVANTAGE

In the abnormality detection system according to the embodiment, the data can be processed consistently from the acquisition of the state value from the subject to be controlled, the calculation of the feature quantity based on the temporal change of the acquired state value, to the judgment of whether there is an abnormality based on the calculated feature quantity.

In the abnormality detection system according to the embodiment, because the frame which is the unit section specified by the predetermined state value is defined, and the frame is used to judge whether there is an abnormality that may occur in the subject to be monitored, the management of sections of the subject to be monitored or the like is facilitated.

In the abnormality detection system according to the embodiment, an arbitrary subframe can be specified for the frame which is the unit section. In this specified subframe, because the feature quantity can be calculated and the abnormality detection processing can be executed based on the calculated feature quantity, a more precise abnormality detection can be realized.

It should be considered that the embodiment disclosed this time is exemplary in all respects and is not restrictive. The scope of the present invention is indicated by claims, not the above description, and is intended to include meanings equivalent to the claims and all modifications within the scope of the claims.

What is claimed is:

1. A control apparatus, comprising a processor configured to:
    acquire the state value generated in a subject to be controlled for each predetermined control period, and update an internal state value held internally;
    for each unit section determined according to a value of a first internal state value, calculate a feature quantity from a change of a second internal state value generated in the unit section, and output the value of the first internal state value used to determine the unit section in correspondence with the calculated feature quantity, wherein the unit section comprises a frame of time-series data, and the feature quantity represents at least one of an average value, a maximum value or a minimum value of the change of the second internal state value over a predetermined time;
    generate a detection result indicating whether any abnormality has occurred in a subject to be monitored comprised in the subject to be controlled, on the basis of the feature quantity and output the value of the first internal state value which is associated with both the detection result and the feature quantity used for generating the detection result; and
    perform a predictive maintenance on the subject to be controlled based on the detection result indicating whether any abnormality has occurred in a subject to be monitored comprised in the subject to be controlled.

2. The control apparatus according to claim 1, wherein the value of the first internal state value is input to the processor.

3. The control apparatus according to claim 1, wherein the processor receives a designation of an internal state value by a user as the first internal state value.

4. The control apparatus according to claim 1, wherein the processor determines a section in which the first internal state value shows the same value as the unit section.

5. The control apparatus according to claim 1, wherein for each unit section, the processor calculates the feature quantity from the change of the second internal state value in a partial section in which a predetermined third internal state value shows a predetermined value in the unit section.

6. The control apparatus according to claim 1, wherein the processor refers to learning data prepared in advance and calculates, from the feature quantity, a value indicating a possibility that any abnormality has occurred in the subject to be monitored.

7. The control apparatus according to claim 6, wherein the learning data comprises a group of feature quantities obtained in a normal case;
    the processor calculates the value indicating the possibility that any abnormality has occurred in the subject to be monitored based on a degree of deviation of the feature quantity with respect to the group of feature quantities comprised in the learning data.

8. The control apparatus according to claim 6, wherein the processor generates a detection result indicating whether an abnormality has occurred in the subject to be monitored based on whether the value indicating the possibility that any abnormality has occurred in the subject to be monitored is within a predetermined threshold range.

9. The control apparatus according to claim 1, further comprising a memory that stores at least one of time series data of the feature quantity corresponding to the value of the first internal state value and time series data of the detection result corresponding to the value of the first internal state value.

10. The control apparatus according to claim 1, wherein the processor further internally holds calculation results of the processor and the processor as internal state values that can be referred to by a program executed by the control apparatus.

11. A non-transitory computer readable medium storing a control program executed by a control apparatus, the control program causing the control apparatus to perform:
    acquiring the state value generated in a subject to be controlled for each predetermined control period and updating an internal state value held internally;
    for each unit section determined according to a value of a first internal state value, calculating a feature quantity from a change of a second internal state value generated in the unit section;
    outputting the value of the first internal state value used to determine the unit section, in correspondence with the calculated feature quantity; wherein the unit section comprises a frame of time-series data, and the feature quantity represents at least one of an average value, a maximum value or a minimum value of the change of the second internal state value over a predetermined time;
    generating a detection result indicating whether any abnormality has occurred in a subject to be monitored comprised in the subject to be controlled, on the basis of the calculated feature quantity;

outputting the value of the first internal state value which is associated with both the detection result and the feature quantity used for generating the detection result; and performing a predictive maintenance on the subject to be controlled based on the detection result indicating whether any abnormality has occurred in a subject to be monitored comprised in the subject to be controlled.

* * * * *